United States Patent [19]

Cannell et al.

[11] 4,284,918

[45] Aug. 18, 1981

[54] POROUS INTERFACE STABILIZED LIQUID METAL CURRENT COLLECTOR

[75] Inventors: Michael J. Cannell, Annapolis, Md.; Slade L. Carr, Jr., Voorheesville, N.Y.; Howard O. Stevens, Severna Park; Harold Surosky, Baltimore, both of Md.

[73] Assignee: The United States of America as represented by the Secretary of the Navy, Washington, D.C.

[21] Appl. No.: 86,181

[22] Filed: Oct. 17, 1979

[51] Int. Cl.³ ............................................ H02K 31/00
[52] U.S. Cl. ...................................... 310/178; 310/219
[58] Field of Search ..................... 310/219, 178, 232; 318/253; 339/5 L, 8 L; 322/48

[56] References Cited

U.S. PATENT DOCUMENTS

| | | | |
|---|---|---|---|
| 3,648,088 | 3/1972 | Wilkin | 310/219 |
| 3,681,633 | 8/1972 | McNab | 319/178 |
| 4,168,446 | 9/1979 | Hatch | 310/219 |
| 4,186,321 | 1/1980 | Marshall | 310/178 |

FOREIGN PATENT DOCUMENTS 1332786 10/1973 United Kingdom ................... 310/178

*Primary Examiner*—R. Skudy
*Attorney, Agent, or Firm*—R. S. Sciascia; L. A. Marsh; W. W. Randolph

[57] ABSTRACT

A homopolar machine comprises a stator provided with channel structures containing liquid metal, a rotor concentrically positioned within the stator with circumferential rotor flanges disposed in the channels, and a porous, resilient braided structure slidably positioned in the channels and immersed in the liquid metal to provide a circumferential wetted surface in intimate contact with the peripheral flange surface. The braided structure comprises a longitudinal strip of braided material supported along its longitudinal edge portions by crimped edges of a braid holder such that the central portion of the braided material is resiliently biased toward the peripheral flange surface. The crimped edges of the braid holder are designed to slide into conforming grooves in the stator channel to facilitate easy replacement of the braided structures. Additional resilience is provided by an additional braided element disposed between the braided material and the braid holder.

14 Claims, 6 Drawing Figures

POROUS INTERFACE STABILIZED LIQUID METAL CURRENT COLLECTOR

The invention described herein may be manufactured and used by or for the Government of the United States of America for governmental purposes without the payment of any royalties thereon or therefor.

BACKGROUND OF THE INVENTION

This invention relates generally to homopolar electrical machines utilizing liquid metal current collectors, and more particularly to a porous, compliant structure interposed between rotor and stator collector rings to maintain electrical contact therebetween and permit such machines to operate with a liquid metal contact under a broad range of operating conditions.

Homopolar machines, which are used both as generators and motors, commonly include a rotationally supported rotor collector assembly concentrically enclosed by a stationary stator collector assembly. The rotor structure normally includes a plurality of radially extending circumferential tips or flanges, wherein each flange is designed to project into a conforming channel formed in the interior surface of the stator such that a radial gap is defined therebetween. Liquid metal is placed in the channels of the stator to span the radial gap and form an electrical contact. Accordingly, as the rotor rotates relative to the stationary stator element, electrical currents are able to pass through the liquid metal contact, between the circumferential flanges of the rotor and the surfaces of the stator channels. Although such arrangement generally allows the use of larger current densities and higher rotational speeds than electrical machines employing common electrical brushes, one problem associated with homopolar machines employing liquid metal contacts involves Lorentz forces produced by electrical currents passing through the liquid metal in the presence of magnetic fields. One effect of such forces is the tendency of the liquid metal to be pushed or expelled from the stator channel such that the contact area between the rotor and stator is reduced. Prior art, as illustrated by U.S. Pat. Nos. 3,984,715; 3,989,968; 4,027,184; and 4,146,807 rely upon means for maintaining or recirculating the liquid metal between the rotor flange and the stator channel. Further, U.S. Pat. Nos. 3,681,633 and 3,796,900 use pressure and centrifugal force to expel liquid metal from hollow rotor passages into collecting means in the stator or stationary member such that electrical contact is maintained therebetween.

Another problem encountered with homopolar machines is the viscous drag effects which occur in the liquid metal as the rotor flanges move through the respective stator channels and tend to reduce the operational speeds of the machines. One proposal for overcoming the drag effects is set forth in U.S. Pat. No. 3,604,967 which discloses a floating ring means immersed in a liquid metal to increase the rotor speeds by reducing the relative velocities between the liquid metal and the adjacent surfaces of the rotor and stationary members.

SUMMARY OF THE INVENTION

Briefly, the electrical current collector structure in a homopolar machine comprises a stator collector ring assembly having internal channels and a rotor current assembly concentrically positioned within the stator assembly such that a circumferential rotor flange is disposed in each stator channel, thereby forming a radial gap therebetween. The current collector structure further includes contact means for transferring electrical currents across the gap. Such transfer or contact means generally comprises a liquid metal current contact disposed in each stator channel and a porous, compliant and resilient means immersed therein and positioned in adjacent relationship with the rotor flange. Utilization of a porous, compliant and resilient means not only resiliently accommodates mechanical and thermal deformations of the rotor and stator assemblies, but cell-like interstices formed therein serve to hold the liquid metal and provide a circumferential wetted surface in intimate contact with the rotor flange. In the disclosed embodiment the porous, compliant means comprises a strip of woven, and preferably, braided material supported along its longitudinal edge portion by a support means in the form of a braid holder such that the central portion of the braided material is biased toward the rotor flange. To additionally bias the resilient, compliant and porous braided material toward the rotor flange, an additional resilient and compliant braided material or other means having similar properties can be employed between the braid holder and the central portion of the porous braided material. The longitudinal edge portions of the braid holder, which are crimped around the longitudinal edge portions of the braid, are designed to slide into conforming grooves in the stator channel such that the porous conducting braided material is disposed in intimate circumferential proximity with the rotor flange.

Accordingly, an object of the present invention is to provide a novel and highly efficient current collector apparatus capable of carrying large current densities at both high and low rotational speeds.

Another object of this invention is the provision of a simplified liquid metal current collector structure which maintains continuous electrical contact between a high speed rotor and a stator apparatus while minimizing resistance and frictional losses therebetween.

A further object of the invention is to provide a porous, compliant and resilient means between a high speed rotor and a stator which stabilizes the liquid metal against various adverse forces while minimizing the requisite amount of liquid metal and maintaining continuous circumferential contact of the liquid metal with the rotor.

Yet another object of the present invention is the provision of a porous, compliant element having cell-like interstices for holding liquid metal and which is constructed to facilitate easy replacement.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

DESCRIPTION OF THE PREFERRED EMBODIMENT

Figure 1:
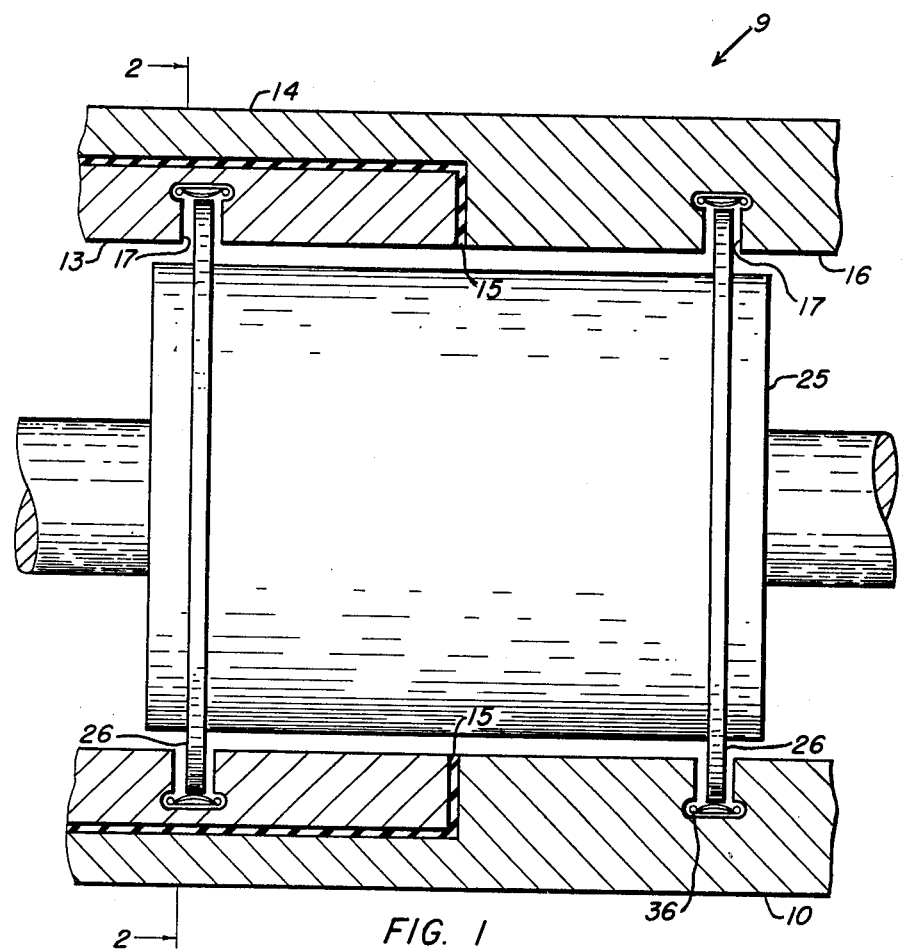
FIG. 1 is a side-view of the homopolar machine with the stator shown in section.
Figure 3:
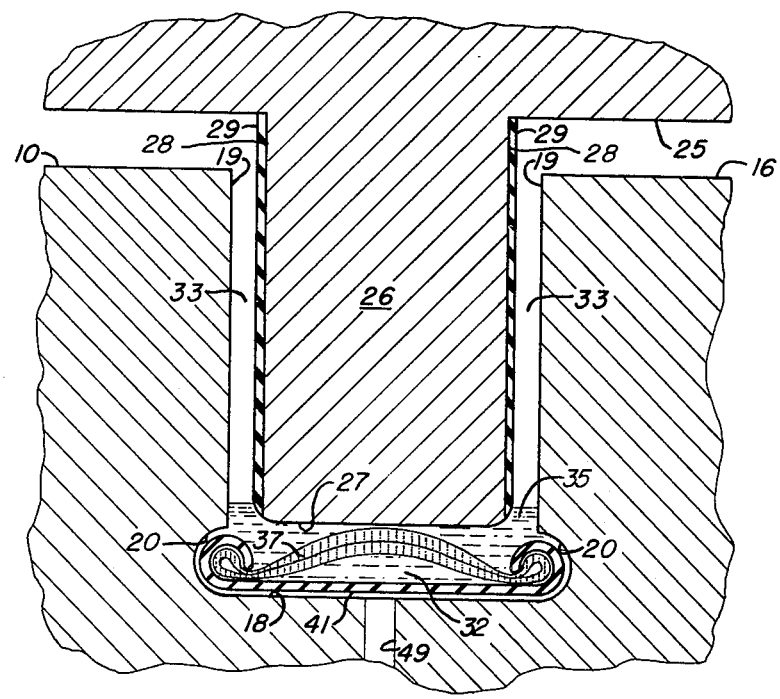
FIG. 3 is an enlarged partial sectional view of a stator channel and rotor flange of FIG. 1.
Figure 2:
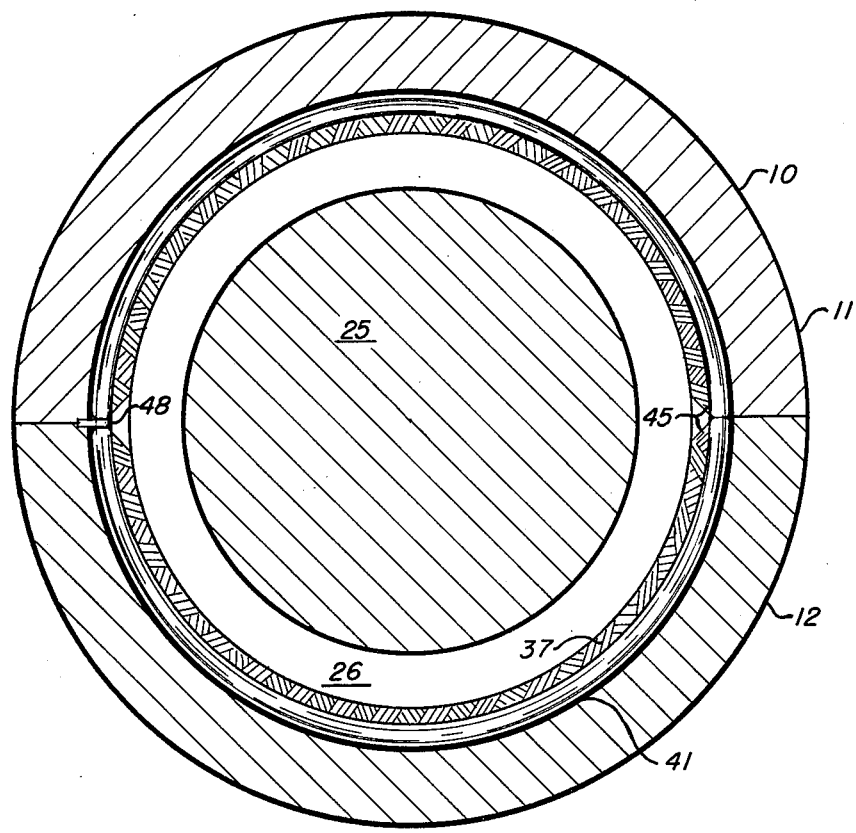
FIG. 2 is a partially sectioned end-view of a homopolar machine as would be generally viewed along line 2—2 of FIG. 1 with portions thereof enlarged to show particular details.

Referring now to the drawings, the homopolar machine 9 generally shown in FIGS. 1 and 2 includes a stator 10 having an inner surface 16 provided with two circumferential, radially extending channels 17 and a rotor 25 concentrically mounted within the stator 10 for rotation therein. The rotor 25 includes peripheral, circumferential flanges 26 secured thereto and positioned within the channels 17 such that a radial gap 32 is defined between the bottom 18 of each channel 17 and the flange tip or peripheral surface portion 27 of the interfitting rotor flange 26. As further shown in FIG. 1, the stator 10 comprises inner 13 and outer 14 interfitting stator sections separated from each other by suitable insulation material 15, wherein each stator section is provided with a channel 17 for permitting current to flow from one of the sections through the respective rotor flange and the rotor to the other rotor flange and then to the other stator section and vice-versa. Although only two channels and interfitting rotor flanges have been shown in the present embodiment, homopolar machines commonly include a plurality of rotor flanges and interfitting stator channels to increase the power rating of the machine. Axial gaps 33, which are more particularly shown in FIG. 3, are defined between the spaced radially extending surfaces 19 of the channel 17 and adjacent radially extending surfaces 28 on the rotor flange 26. To prevent flow of current between the radial surfaces 28 of the rotor flange 26 and the channel 17, the radial surfaces 28 of the rotor flange 26 are coated with suitable insulation material 29 such as flame sprayed aluminum oxide.

Means for transferring electrical currents across the radial gap generally comprises a liquid metal current contact 35 disposed in the stator channel 17 and a porous, compliant and resilient means 36 immersed therein and positioned adjacent to the peripheral flange surface 27. The liquid metal 35 preferably comprises sodium-potassium metal (NaK) although mercury or a low melting point alloy, such as Woods metal or an alloy of tin, bismuth, indium and lead, would be compatible with the present invention. Although not restricted to an electrically conductive material the porous, compliant means preferably consists of a sleeve of braided metal 37, such as, for example, tin coated flat copper braid having a nominal width of 15/32 inch and a thickness of about 0.040 inch. The metal braid 37, is pressed flat so that the sleeve-type braid construction effectively forms a double layer containing a plurality of cell-like interstices. Other compatible materials exhibiting durability and relatively low electrical resistance with respect to the liquid metal include copper and chromium alloys as well as coatings of gold, silver and nickel.

As shown in FIGS. 3-6, the braided material 37 is longitudinally supported along its edge portions 38 by a support means in the form of a braid holder 41 which laterally compresses the braided material 37 such that the central portion 39 of the braided material assumes a crowned or curved profile and is resiliently biased toward the adjacent flange surface 27. To maintain the braided material 37 in a fixed position, the peripheral longitudinal edges 42 of the braid holder 41 are crimped around the longitudinal edges 38 of the braided material 37. Thus, the resiliently biased configuration of the porous braided material 37 and the cell-like interstices formed therein, which tend to retain the liquid metal 35 both in and adjacent to the braid, provide a wetted conducting surface in contact with the flange surface 27. Additionally, the resilient and compliant characteristics of the dual layer braided material 37 are such that the central portion 39 of the braided material 37 can be maintained in close proximity to and in some instances in light contact with the flange surface 27. Such arrangement further serves to reduce the requisite amount of liquid metal in the channel structurs 17 and stabilizes the liquid metal at the flange surface 27—braided material 37 interface such that the effects of drag and adverse electromagnetic (e.g., Lorentz) forces thereabout are minimized. It is further noted that although the central portion 39 of the braided material 37 is maintained in adjacent relationship with the flange surface 27, the edge portions 38 of the braided material 37 are maintained in spaced relationship with the edges of the coated radial flange surfaces 28 to preclude abrasive wearing therebetween.

Figure 4:
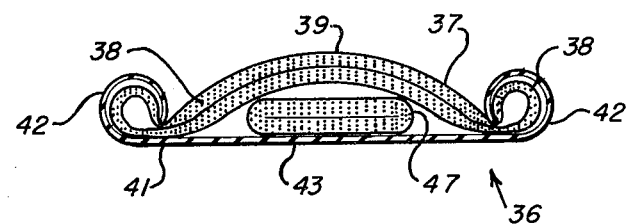
FIG. 4 is a cross-sectional view of an alternative porous, compliant and resilient conducting structure.
Figure 5:
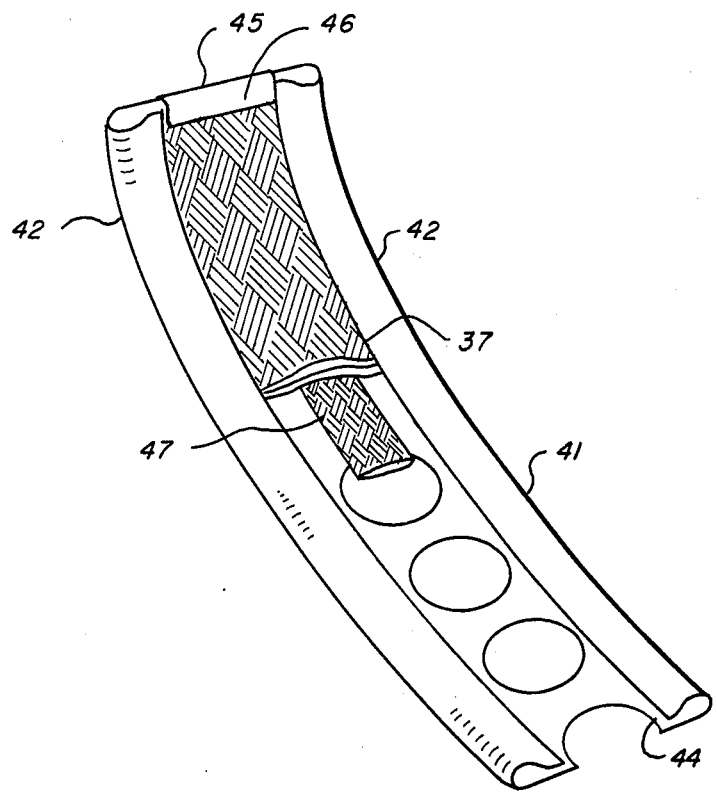
FIG. 5 is a front perspective view of the porous, compliant element broken away to expose the components thereof.
Figure 6:
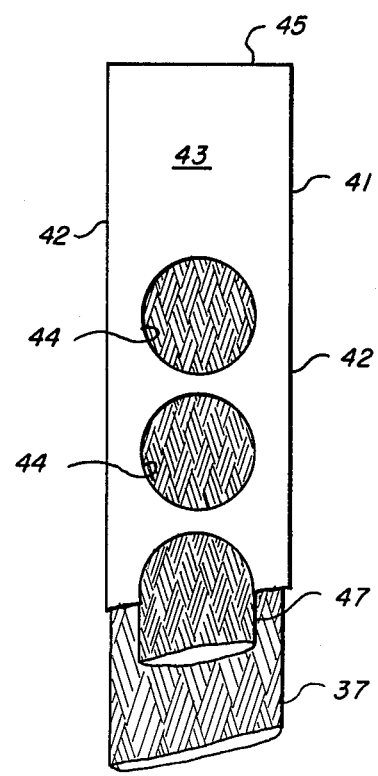
FIG. 6 is a rear view of the porous, compliant element broken away to show various components thereof.

To provide the braided material 37 with additional resiliency so that the central portion 39 will have a rapid recovery when compressed by the rotor surface, an additional biasing means in the form of a second porous, compliant braid 47 of sleeve type construction can be interposed between the braid holder 41 and the central portion 39 of the braided material 37. As shown in FIGS. 4-6, the second longitudinal braid 47 has a smaller width dimension than the braided material 37 and braid holder 41 so that the central portion 39 is biased to assume a crowned configuration.

In the particular structure of the preferred embodiment, access to the interior of the homopolar structure 9 is generally facilitated by constructing the stator of interfitting segments 11, 12 as depicted in FIG. 2. Although only one semicircular braid construction is provided for each channel 17 in the semicircular segments of FIG. 2, two or more curved braid constructions may be provided for the channels of large diameter stator segments. To maintain the braid constructions in uniformly exact position within the channel structures 17 the longitudinal edge portions 42 of the braid holders 41 are designed to slide into conforming grooves 20 carefully machined in the radial surfaces 19 of the channels 17. The rolled and crimped configuration of the edge portions 42 of the braid holder 41 permit the edge portions 42 to snugly engage the grooves 20 of the channel 17 and accommodate thermal and mechanical distortions under a wide range of operating conditions. Additionally, the curved braid holders 41 provide the braided material 37 with circumferential stiffness to prevent the material 37 from buckling and bunching. Thus when the semicircular stator segments 11, 12 are assembled together, the curved braid structures cooperate to provide an essentially continuous braid arrangement which circumferentially encloses the adjacent rotor flange 26. To prevent relative rotation of the braid holders 41 in the stator channels 17, key means in the form of a plate 48 is disposed in a conforming recess in each channel structure and preferably at the interface between the stator segments. The end portions 45 of each braid holder 41 include integral tabs 46 which are crimped over the respective ends of the braided material 37, after the end portions of the braided material have been secured to the holder as by spot welding to the braid holder, to prevent loose wires from wearing against the rotor flange 26.

Due initial operation, the braid structures are inserted into respective stator channels 17 and the stator segments 11, 12 are assembled together. After following standard purging procedures for homopolar machines using reactive liquid metal, wherein moisture and other undesirables are removed from the system, the machine is operated at a low speed for wear-in of the braid material. Liquid metal 35 may be withdrawn from or supplied to the machine through one or more fluid conduits 49 opening into the bottom of the channels. Although not specifically shown in the present disclosure, the bottom surface 18 of the stator channels 17 may include circumferential recessed portions to permit free flow of liquid metal between the braid holder 41 and the bottom 18 of the channel 17. The central portion of the braid holders 41 are provided with a plurality of holes 44 as shown in FIGS. 5 and 6, wherein some of the holes 44 are designed to align with the openings of the fluid conduits 49 to permit free flow of liquid metal therethrough. The holes 44 provide the further benefit of allowing the liquid metal 35 to intimately contact the bottom 18 of the channel 17 to permit continuous electrical contact therebetween.

Under normal operation the liquid metal 35 is uniformly distributed in the stator channels 17 and maintained in continuous circumferential contact with the flange surface 27. Upon cessation of operation, the presence of the braided material causes the liquid metal to remain largely distributed in the channels, about the periphery of the rotor so that subsequent start-up is relatively simple as compared with other homopolar machines.

In a homopolar machine constructed according to the present invention a rotor was provided with two rotor flanges having diameters of 4.872 inches and 5.538 inches and respective thicknesses of 0.159 inches and 0.136 inch. Each rotor flange 26 was disposed in a conforming stator channel 26 such that the axial gaps 33 were on the order of about 0.020 inch and the radial gap 32 between the flange surface 27 and the channel bottom 18 was about 0.080 inch. To maintain the braid material 37 in close proximity or perhaps in light contact with the flange surface 27, the braid holder 41 was dimensioned to have a thickness of about 0.010 inch, the additional braid material 47 had a thickness of about 0.030 inch and the braid material 37 had a thickness of about 0.040 inch. The flat, tin coated copper braid was manufactured by New England Electric Wire Corporation, Lisbon, New Hampshire.

With the aforementioned type of electrical machine, operational test results were as follows:

(1) High Power Load Test: A power of 439 horsepower was achieved at a current density of 6,250 amps/square inch, with an applied axial magnetic field of 46,000 gauss and a flange tip (flange surface 27) speed of 240 feet/second. The maximum power attained was limited by the thrust capacity of the machine driving the homopolar machine.

(2) Short Circuit Test: A current density of 17,000 amps/square inch was generated at a flange tip (flange surface 27) speed of 168 feet/second. The test results were limited by the current carrying capacity of other elements of the homopolar machine.

(3) Test Rig Results: With a magnetic field of 14,000 gauss, and a flange tip (flange surface 27) speed of 320 feet/second, the bearing and speed capacity of the machine was attained.

Obviously many modificatons and variations of the present invention are possible in light of the above teachings. For example, means having resilient characteristics may be substituted for the additional braid material 47. Further, for example, the braid structure may be utilized in a wide variety of situations where electrical elements exhibit relative rotary motions such as an electrical joint. It is therefore to be understood that within the scope of the appended claims the invention may be practiced otherwise than as specifically described.

What is claimed is:

1. A homopolar electrical machine comprising:

a stator having an inner surface with channels formed therein, each said channel including radial sidewalls and a bottom surface portion;

a rotor concentrically positioned within said stator, said rotor including outwardly projecting flanges, each of said flanges extending into a respective channel in said stator and being spaced from said radially extending sidewalls and said bottom portion;

liquid metal disposed in each said channel for making electrical contact between said flange and said channel;

a porous means removably secured in said channels and immersed in said liquid metal for maintaining said liquid metal in contact with said flanges;

means for removably securing said porous means in said channels;

said porous means comprises a porous, compliant strip of resilient material and a support means supporting said strip of material along its longitudinal edge portions such that the central longitudinal portion of said strip of material is resiliently biased toward the peripheral surface of said flange;

said strip of material comprises a porous material of woven filaments to provide a plurality of interstices therein and said support means comprises a holder element for said material having longitudinal edge portions crimped around respective said longitudinal edge portions of said strip of material to maintain said central portion in the biased position; and said means for securing said porous means includes grooves formed in opposite sidewalls of said channels and said longitudinal crimped edges of said holder element are dimensioned to slidably engage said grooves and to maintain said strip of material in a fixed position.

2. The machine of claim 1, wherein said holder element includes aperatures formed therein to permit circulation of liquid metal between said strip of material and said channel bottom.

3. The machine of claim 1, wherein said strip of material comprises multiple layers of braided filaments having a plurality of cell-like interstices formed therein.

4. The machine of claim 3, further comprising a ribbon of resilient, porous material disposed between said strip of material and said holder element to maintain said central portion of said strip of material in a biased position.

5. A current collector element for use in electrical machines having a rotary member disposed in contact with liquid metal contained in grooves in a stationary member and for maintaining electrical contact between the rotary member and the stationary member, comprises:
a porous, resilient strip of woven material secured along its edge portions to rolled, crimped edge portions of a longitudinal holder element for said material such that the central portion of said strip of material is resiliently biased away from said holder element to assume an arcuate configuration, said edge portions of said holder element being configured to engage the grooves in the stationary member.

6. A homopolar electrical machine comprises:
a cylindrical stator having an inner surface with channels formed therein;
a rotor concentrically positioned within said stator, said rotor including radial flanges extending into said channels and being spaced from the walls of said channels;
liquid metal disposed in said channels for making electrical contact between said flanges and the walls of said channels; and
a porous means removably secured in said channels for maintaining said liquid metal in contact with said flanges, said porous means comprises an elongated strip of pourous, resilient material secured to an elongated holder element, and the longitudinal edges of said holder element slidably engaging the walls of said channels for maintaining said holder element and said strip of material in a fixed position.

7. The structure of claim 6, wherein:
said strip of material has a plurality of interstices formed therein and said holder element has longitudinal edge portions crimped around the longitudinal edge portions of said strip of material so that the central portion said strip of material is resiliently biased to assume an arcuate profile in close proximity with the peripheral surface of the adjacent rotor flange.

8. The structure of claim 6, wherein:
said strip of material comprises a porous strip of resilient woven material having a plurality of interstices formed therein, said holder element has longitudinal edge portions secured to the longitudinal edge portions of said strip of material, and said longitudinal edge portions of said holder element are slidably received by opposing grooves formed in the walls of said channels.

9. The structure of claim 6, wherein:
a plurality of said strips of material and the respective holder elements are disposed in end-to-end relationship in a channel to circumferentially enclose an adjacent rotor flange such that a continuous liquid metal surface is maintained in contact with said flange.

10. The machine of claim 9, further comprising means for maintaining each said holder element in a predetermined position in respective said stator channel.

11. A current collector element for use in electrical machines having a rotary member disposed in contact with liquid metal contained in channels in a stationary member, wherein the liquid metal maintains electrical contact between the rotary member and the stationary member comprises:
a porous, resilient, elongated strip of woven material; and
an elongated holder element secured to said strip so that the longitudinal central portion of said strip is resiliently biased away from said holder element to assume an arcuate configuration, and the longitudinal edge portions of said holder element comprise means for slidably engaging the channels in the stationary member.

12. The collector element of claim 10, wherein said woven material comprises a braid of metal filaments.

13. The collector element of claim 10, further comprising a ribbon of porous, resilient material interposed between said strip of material and said holder element to provide additional resilience to said central portion of said strip of material.

14. A current collector element for use in electrical machines having a rotary member disposed in contact with liquid metal contained in grooves in a stationary member and for maintaining electrical contact between the rotary member and the stationary member, comprises:
an elongated holder element hving longitudinal edge portions; and
a porous, resilient strip of woven material having longitudinal edge portions and a longitudinal central portion, said longitudinal edge portions of said strip of material are secured to said longitudinal edge portions of said holder element so that said longitudinal central portion of said strip of material is resiliently biased away from said holder element, and said longitudinal edge portions of said holder element are configured to engage the grooves in the stationary member.

* * * * *